(12) United States Patent
Krämer et al.

(10) Patent No.: US 8,955,665 B2
(45) Date of Patent: Feb. 17, 2015

(54) CONTAINER TREATMENT MACHINE

(75) Inventors: Klaus Krämer, Dortmund (DE);
Thomas Stienen, Unna (DE)

(73) Assignee: KHS GmbH, Dortmund (DE)

( * ) Notice: Subject to any disclaimer, the term of this patent is extended or adjusted under 35 U.S.C. 154(b) by 913 days.

(21) Appl. No.: 13/131,051

(22) PCT Filed: Dec. 15, 2009

(86) PCT No.: PCT/EP2009/008954
§ 371 (c)(1),
(2), (4) Date: May 25, 2011

(87) PCT Pub. No.: WO2010/081515
PCT Pub. Date: Jul. 22, 2010

(65) Prior Publication Data
US 2011/0233838 A1    Sep. 29, 2011

(30) Foreign Application Priority Data

Jan. 15, 2009    (DE) .......................... 10 2009 005 180

(51) Int. Cl.
*B65G 47/244*    (2006.01)
*B65C 9/04*    (2006.01)
*B65C 3/16*    (2006.01)

(52) U.S. Cl.
CPC ................ *B65C 9/04* (2013.01); *B65G 47/244* (2013.01); *B65C 3/16* (2013.01)
USPC .................................. 198/377.01; 198/478.1

(58) Field of Classification Search
USPC .............. 198/377.01, 377.1, 378, 478.1, 608; 156/567, 568
See application file for complete search history.

(56) References Cited

U.S. PATENT DOCUMENTS

| 3,238,908 | A | * | 3/1966 | Gilbert ............................ 413/50 |
| 4,460,432 | A |   | 7/1984 | Jorss |
| 5,419,094 | A |   | 5/1995 | Vander Bush et al. |
| 6,345,713 | B1 | * | 2/2002 | Ronchi ..................... 198/377.03 |
| 6,398,006 | B1 | * | 6/2002 | Dault ........................ 198/377.01 |
| 7,093,705 | B2 | * | 8/2006 | Ohiro et al. .............. 198/377.08 |
| 2006/0086410 | A1 |   | 4/2006 | Bernhard |

FOREIGN PATENT DOCUMENTS

| DE | 3134661 | 3/1983 |
| DE | 20019839 | 2/2001 |
| JP | 01-069937 | 3/2001 |

* cited by examiner

*Primary Examiner* — Mark A Deuble
(74) *Attorney, Agent, or Firm* — Occhiuti & Rohlicek LLP

(57) ABSTRACT

The invention relates to a revolving treatment machine for treating containers, comprising a rotor element which can be driven to revolve about a vertical machine axis and which is used as a container support or forms a container support. The treatment machine further comprises a support element for at least one functional element of the machine which interacts with the containers, said support element being drivable as to revolve about the vertical machine axis.

19 Claims, 8 Drawing Sheets

CONTAINER TREATMENT MACHINE

CROSS-REFERENCE TO RELATED APPLICATIONS

This application is the National Stage of International Application No. PCT/EP2009/008954, filed on Dec. 15, 2009, which claims the priority of German Patent Application No. 10 2009 005 180.5, filed on Jan. 15, 2009. The contents of both applications are hereby incorporated by reference in their entirety.

FIELD OF INVENTION

The invention relates to a rotary container-treatment machine.

BACKGROUND

Known rotary container-treatment machines include a carousel or rotor that can be driven to rotate about a vertical machine axis and that, on at least a first rotor element, form container supports, for example container plates, that can be, for example, rotated or swiveled in a controlled manner.

Such container-treatment machines also include at least one second rotor element permanently connected to the first rotor element, and functional elements, such as clamping and/or centering elements, each allocated to one container support. The elements can be moved, for example through a predefined vertical lift, in a controlled manner by, for example, a lifting cam on a section of a machine frame that does not rotate with the rotor (support element as lifting cam support), i.e. they are movable up and down parallel to the machine axis.

When the container-treatment machine is embodied as a labeling machine, the containers to be treated, i.e. labeled, are fed sequentially via a container inlet to the treatment stations or treatment positions, each configured on the rotor by a container support and a centering element. The centering element concerned is lowered by the lifting cam in a controlled way onto the top, or head, of a container at the moment when the container is transferred to a treatment position. As a result, during treatment, the container is centered with its vertical container axis relative to the container support or the latter's axis and held clamped between the container support and the centering element. The containers are treated during the rotary motion of the rotor in an angular range between the container inlet and the container outlet, at which the containers are removed from the treatment position concerned after the centering element concerned is raised by the lifting cam.

One of the disadvantages of known rotary container-treatment machines is that the lifting cam support, which has at least one lifting cam, must be mounted, with a bearing, for example with a plain bearing, on the rotor that can be driven to rotate about the machine axis, and that at least one torque arm is required to connect the lifting cam support to a part of the machine frame that does not rotate with the rotor to prevent the lifting cam support from rotating together with the rotationally driven rotor.

A further disadvantage of known rotary container-treatment machines is that bearing elements or support elements that are arranged within the circular trajectory of the container supports or treatment positions and that accommodate functional elements not rotating with the rotor must also be mounted with bearings on the rotor and be connected by torque arms to the machine frame that does not rotate with the rotor to stop them from rotating together with the rotor. Such torque arms are then provided in an angular range of the rotational motion of the rotor between the container outlet and the container inlet, in which angular range there are, during normal trouble-free operation, no containers present at the treatment positions. Examples of such accommodated functional elements include pressing elements, or brushes for pressing or brushing labels onto the containers during labeling, to accommodate printers or print heads for printing the containers, cameras, sensors, lighting devices etc.

The known rotary treatment machines require a considerable engineering effort, with the structural conditions also being extremely adverse. Although the mounting on the rotating rotor of the support elements that do not rotate with the rotor, and the use of torque arms, prevents the support element concerned, e.g. lifting cam support and support element for the other functional elements, from rotating with the rotor, the mounting of these elements on the rotor causes those elements to always vibrate during operation, and result in an undesirable heat input through friction. This also leads to a not inconsiderable fouling of the container-treatment machine by escaping lubricants.

SUMMARY

An object of the invention is to provide a container-treatment machine that avoids the aforesaid disadvantages and in which at least one support element not rotating with the rotor is realized without the need for one or more torque arms.

The particularity of the invention is that at least one first rotor element that forms the container support or that is realized with a plurality of container supports that are rotatable or pivotable, preferably in a controlled manner, and at least one further support element, are mounted so as to be able to rotate independently about the machine axis and independently and are driven by the driving means.

According to a first aspect of the invention, this drive is effected by a driving means in such a way that the at least one support element rotates synchronously and in the same direction with the at least one rotor element, so forming a further rotor element that rotates with the rotor and on which there are provided, for example, functional elements, for example centering elements, acting together with the containers and moved together with the rotor.

According to a second aspect of the invention, the drive is effected by driving means in such a way that the at least one support element is driven synchronously with the at least one rotor element or with the rotor but contrary to the direction of rotation of the rotor so that the support element is stationary relative to the rotating rotor and the support element forms a support on which functional elements not rotating with the rotor and preferably interacting with the containers can be arranged. Examples of such functional elements include pressing elements and/or brushes, printers, sensors, cameras, in particular also for inspecting and/or aligning the containers etc.

In the first case, the support element forming a further rotor element and the first rotor element are preferably each mounted rotatably on a machine frame, both rotor elements each mounted with at least one independent bearing. In the second case the support element is mounted on the rotor so that it can rotate about the machine axis.

In one aspect, the invention features an apparatus for treating containers. Such an apparatus includes a container-treatment machine having at least one rotor element that can be driven to rotate about a vertical machine axis and serving as or exhibiting a container support, and a support element associated with the rotor element, the support element being also rotationally drivable about the vertical machine axis for at least one functional element interacting with the containers. The rotor element and the support element are configured as autonomous rotating elements that are mounted independently of one another so as to be able to rotate about the vertical machine axis. The support element is a ring-like support element that concentrically encloses the machine axis. The rotor element is an annular rotor element having an annular axis that is coaxial with the machine axis.

In some embodiments, the rotor element and the support element are mounted independently of one another on a machine frame that does not rotate with either the rotor element or the support element.

In other embodiments, the rotor element is either a disc-like turntable or a spoked-wheel-like turntable.

Also included are embodiments in which the support element is configured like one of a disc and a spoked wheel.

In some embodiments, the support element comprises a further rotor element for functional elements that are moved with the rotor and/or that interact with the containers. In these embodiments, the further rotor element is mounted on a machine frame with an autonomous bearing so as to be able to rotate about the machine axis. Among these embodiments are those in which the functional elements are centering elements, or centering bells, either of which can be displaced in a controlled manner. These embodiments can also include a lifting cam on a cam support of a machine frame that does not rotate with the rotor, and control elements that engage the cam for the controlled displacement of the functional elements.

In some embodiments, the container-treatment machine further comprises actuating or adjusting means, on the support element, for the motorized controlled displacement of the functional elements provided on the support element. Among these are embodiments in which the actuating or adjusting means comprises a hydraulic actuator, a pneumatic actuator, or an electric actuator.

In other embodiments, the container-treatment machine further comprises driving means for causing synchronous rotational motion, in both speed and angle, of the at least one rotor element and of the at least one support element. These embodiments include those in which the element is configured as a further rotor element, the driving means is configured to drive the at least one rotor element and the support element in the same direction. These embodiments also include embodiments in which the support element is configured as a support for functional elements not rotating with the rotor element, the driving means is configured to drive the rotor element and the support element in opposite directions, embodiments in which the driving means comprises autonomous drives having corresponding drive motors, and embodiments in which the driving means comprises a drive with a common drive motor to which the rotor element and the support element are connected for driving purposes by at least partly different drive trains. These latter embodiments include those in which either the rotor element or the support element is connected by a first drive train driven by the motor, and the rotor element and the support element are interconnected for driving purposes by a second drive train.

Additional embodiments include those in which the container-treatment machine is configured for of labeling containers, printing on containers, and inspecting containers.

In another aspect, the invention features an apparatus for treating containers. Such an apparatus includes a container-treatment machine having a rotor element that can be driven to rotate about a vertical machine axis and serving as or exhibiting a container support, support element associated with the rotor element. The support element is also rotationally drivable about the vertical machine axis for functional elements interacting with the containers. The rotor element and the support element are configured as autonomous rotating elements that are mounted independently of one another so as to be able to rotate about the vertical machine axis. The support element comprises a further rotor element for functional elements that are moved with the rotor and/or that interact with the containers. The further rotor element is mounted on a machine frame with an autonomous bearing so as to be able to rotate about the machine axis. The container-treatment machine further comprises actuating or adjusting means, on the support element, for motorized controlled displacement of the functional elements provided on the support element.

In some embodiments, the actuating or adjusting means comprises a hydraulic actuator, a pneumatic actuator, or an electric actuator.

In another aspect, the invention features an apparatus for treating containers. Such an apparatus includes a container-treatment machine having a rotor element that can be driven to rotate about a vertical machine axis and serving as or exhibiting a container support, and a support element associated with the rotor element. The support element is also rotationally drivable about the vertical machine axis for a functional element interacting with the containers. The rotor element and the support element are configured as autonomous rotating elements that are mounted independently of one another so as to be able to rotate about the vertical machine axis. The container-treatment machine further comprises driving means for causing synchronous rotational motion, in both speed and angle, of the rotor element and of the support element. The support element is configured as a support for functional elements not rotating with the rotor element. The driving means is configured to drive the rotor element and the support element in opposite directions.

As used herein, "containers" includes structures for packing products, e.g. beverages, foods, cosmetics, drugs etc. It also includes bottles, or other bottle-like or can-like containers made from very diverse materials, e.g. metal, glass or plastic, for example PET.

Further embodiments, advantages, and possible applications of the invention arise out of the following description of embodiments and out of the figures. All of the described and/or pictorially represented attributes, whether alone or in any desired combination, are fundamentally the subject matter of the invention independently of their synopsis in the claims or their cross-references. The content of the claims is also made an integral part of the description.

BRIEF DESCRIPTION OF THE DRAWINGS

The invention is further explained hereinbelow by references to the figures, in which.

DETAILED DESCRIPTION

Figure 1:
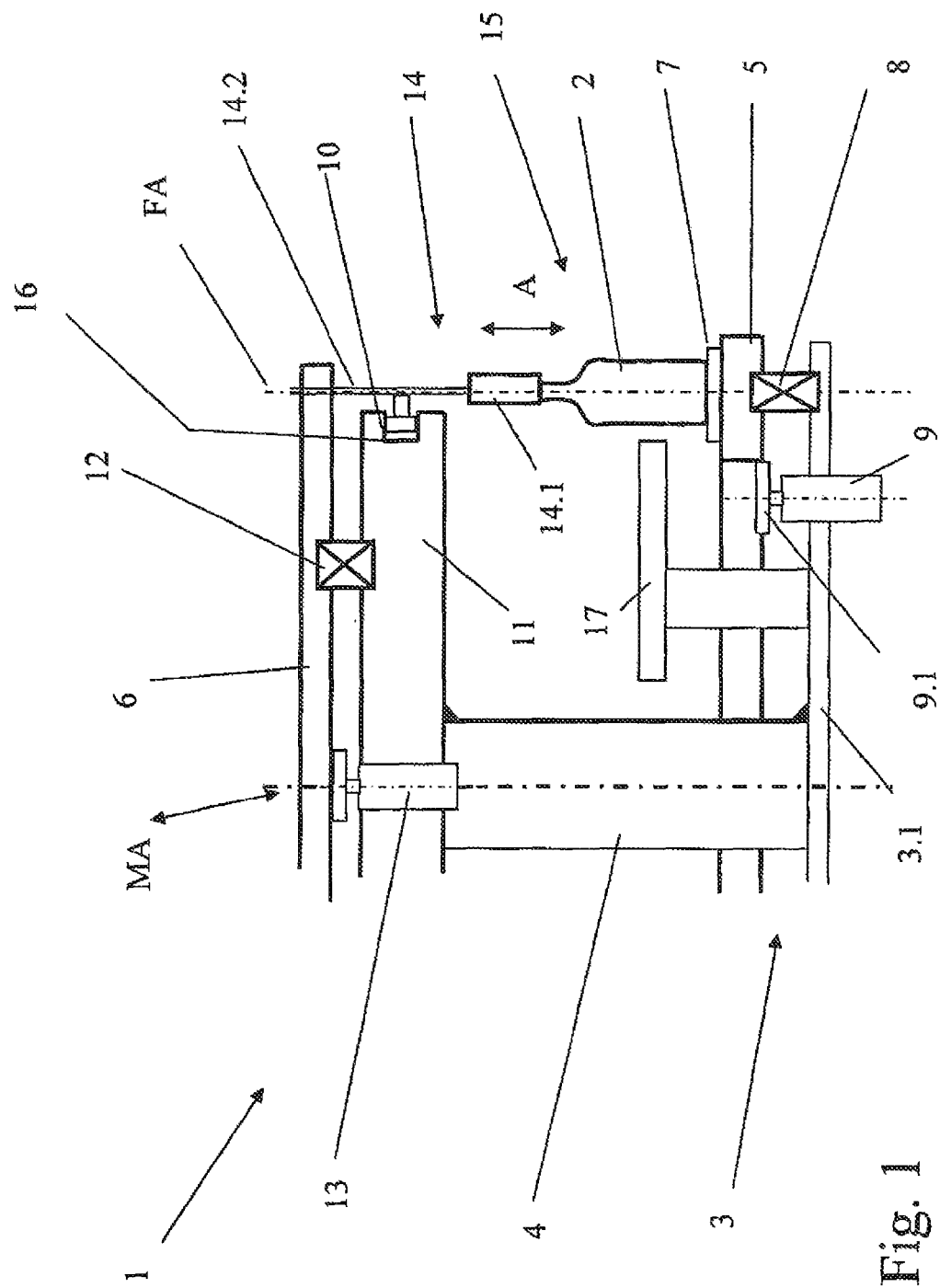
FIG. 1 shows a first embodiment of a rotary container-treatment machine in simplified schematic representation and vertical cross-section.

FIG. 1 shows a first rotary container or bottle treatment machine 1 for treating containers, such as bottles 2, for example for labeling and/or printing bottles 2. The first container-treatment machine 1 comprises a machine frame 3 with a central pillar 4 disposed on the same axis as a vertical machine axis MA, and a rotor that is driven circumferentially about the vertical machine axis MA while treating the bottles 2.

In the illustrated embodiment, the rotor includes a lower annular rotor element 5 and an upper rotor element or support element 6. The lower rotor element 5 and the support element 6 are disposed with their axes on the same axis as the machine axis MA. The lower rotor element 5 is provided on its upper side with a plurality of bottle plates 7 that, as container supports, each form a base for the bottles 2, that are distributed at even angular distances about the machine axis MA, and that are preferably rotatable or pivotable in a controlled manner about their axes FA parallel to the machine axis MA. The lower rotor element 5 is mounted by a bearing 8 to a lower section 3.1 of the machine frame 3 so as to be able to rotate about the machine axis MA. A suitable bearing 8 is a ball-bearing slewing ring.

A first drive 9, shown in FIG. 1, which interacts with a pinion 9.1 with gearing on the inside of the lower rotor element 5, drives this rotor element about the machine axis MA. At the top of the pillar 4 is a lifting cam support 11 of the machine frame 3. The lifting cam support 11 stands radially away from the pillar 4 and is provided at its outer end with a control or lifting cam 10. On the lifting cam support 11, an upper support element 6 is mounted by a bearing 12 so as to rotate about the machine axis MA. The bearing 12 may again be a ball-bearing slewing ring, for example. As shown schematically in FIG. 1, a second drive 13 provided on the machine frame 3 drives the support element 6 about the machine axis MA.

The first and second drives 9, 13 are, for example, single drives that, when the container-treatment machine 1 is in operation, permit a synchronous and co-directional rotation, i.e. a rotation synchronized in both speed and angle, of the rotor element 5 and the support element 6. The first and second drives 9, 13 can, for example, be drives with controllable electrical synchronous or stepper motors. It is however also possible for the first and second drives 9, 13 to have a common drive motor that is then connected to the rotor element 5 and to the support element 6 via appropriate transmissions for driving purposes.

A plurality of centering elements 14 with centering tulips 14.1 are provided in the upper support element 6. The centering elements 14 are distributed at equal angular intervals about the machine axis MA in such a way that each centering element 14 is above one bottle plate 7 and each centering element 14 is positioned with its axis on the same axis as the axis FA of the bottle plate 7 concerned such that a bottle plate 7 and a centering element 14 each form one treatment position on the circumference of the rotor 5/6 and such that this treatment position can be driven to rotate about machine axis MA. Each centering tulip 14.1 is held at a lower end of a centering tulip rod 14.2 that is arranged with its axis parallel to the machine axis MA and mounted in the support element 6 so as to be axially displaceable and to have its displacement be controlled by a control roller 16 that engages the lifting cam 10 and that is provided on the centering tulip rod 14.2, as indicated by the double-ended arrow A in FIG. 1.

On the machine frame 3, there are further provided functional elements that do not rotate with the rotor 5/6. For example, when the container-treatment machine 1 is configured as a labeling machine, a functional element includes the brush holder or brush channel holder 17, schematically indicated in FIG. 1, and the brushes thereon, which are provided but not illustrated in FIG. 1, with which the label transferred by a labeling unit of the treatment machine 1 to a bottle 2 is affixed or brushed on to that bottle.

One feature of the container-treatment machine 1 is that those functional elements of the container-treatment machine that do not rotate or turn with the rotor 5/6, in particular the lifting cam support 11 and other functional elements, such as the brush holder or the brush channel holder 17, are provided directly on the machine frame 3. The torque absorbers or torque arms that are usually necessary with container-treatment machines, including, in particular, labeling machines, to prevent such functional elements from rotating with the rotor 5/6, and which normally entail substantial constructional complexity, are avoided. A further feature is that, by configuring the lower rotor element 5, which forms the base, or bottle plate, for the containers or bottles 2 as a ring, the space within the rotor element is kept free to accommodate other functional elements that do not rotate with rotor 5/6, for example, to accommodate the brush holders or the brush channel holders 17.

Figure 2:
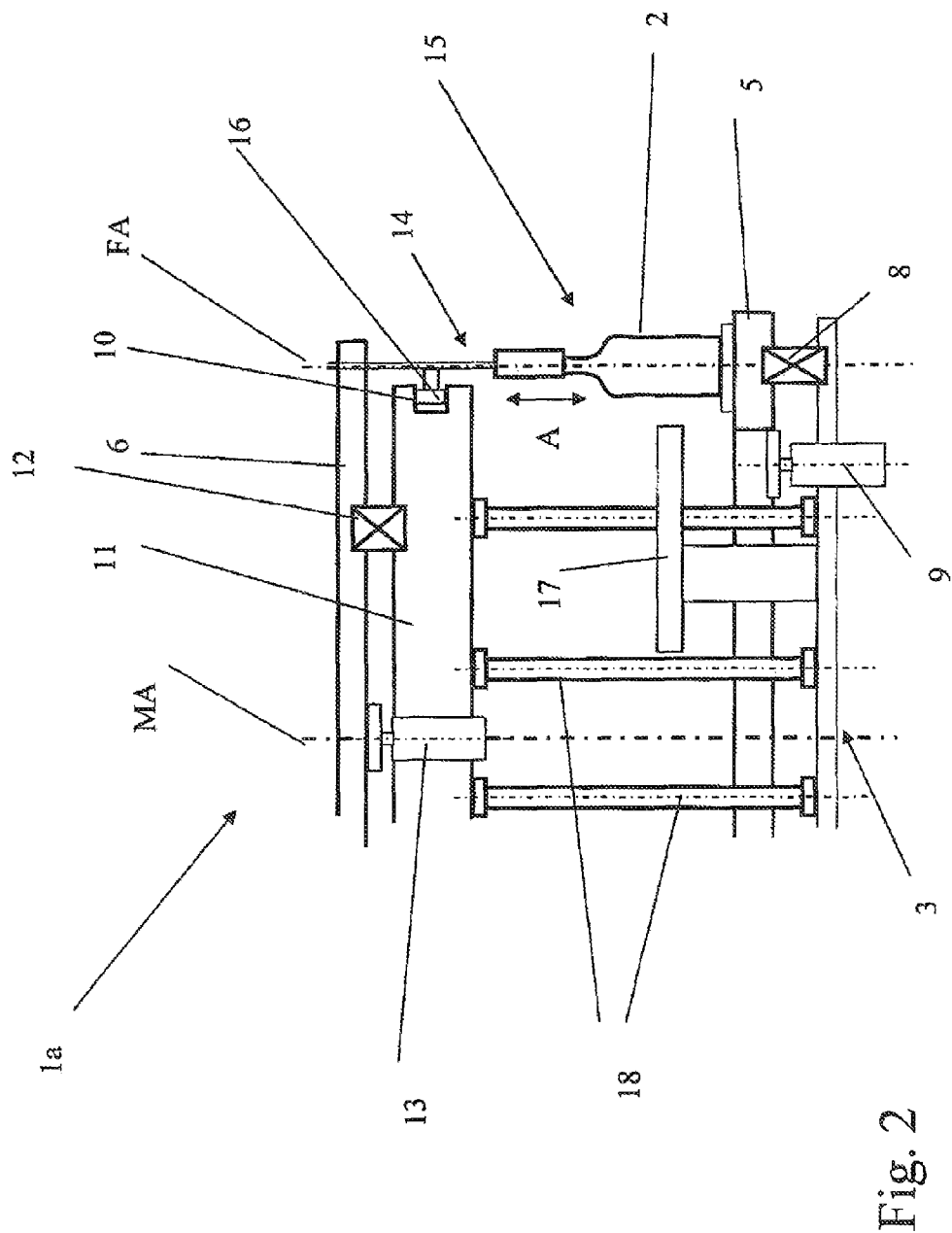
FIG. 2 shows a second embodiment of a rotary container-treatment machine in simplified schematic representation and vertical cross-section.

FIG. 2 shows, as a further embodiment, a second container-treatment machine 1a whose only essential difference from the first container-treatment machine 1 is that, instead of the single pillar 4, the machine frame 3a has a plurality of pillars 18 that are arranged with their axes parallel to the machine axis MA and that are, for example, distributed at equal angular distances about the machine axis MA and disposed at the same radial distance from the machine axis MA. At the upper ends of the pillars 18 is attached a lifting cam support 11 that again has a lifting cam 10 at an outer end thereof and that projects radially over the pillar arrangement formed by pillars 18. Otherwise container the second treatment machine 1a is the same as the first container-treatment machine 1, in particular in relation to the mounting and drive of the rotor element 5 and of the support element 6 by way of the bearings 8, 12 and first and second drives 9, 13.

The use of a plurality of pillars 18, which can also be disposed further away from the machine axis MA, creates a cage-like structure of greater strength and rigidity for the machine frame 3, and also for the arrangement of the lifting cam support 11, which carries lifting cam 10.

Figure 3:
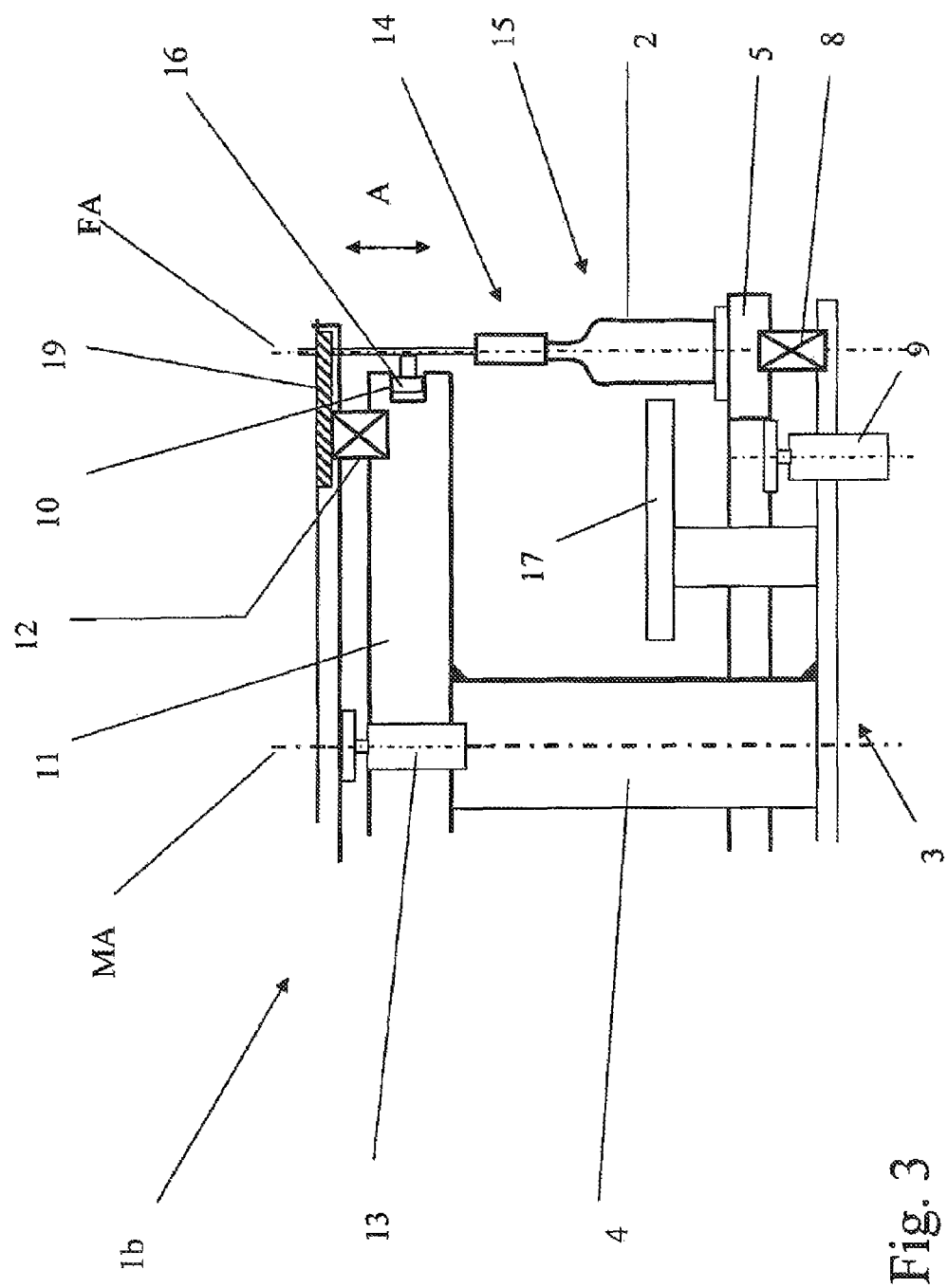
FIG. 3 shows a third embodiment of a rotary container-treatment machine in simplified schematic representation and vertical cross-section.

FIG. 3 shows, as a further embodiment, a third container-treatment machine 1b whose only essential difference from the first container-treatment machine 1 is that, instead of the disc-shaped upper support element 6, an annular upper support element 19 lying on the same axis as the machine axis MA is provided, which is part of the rotor 5/19 and on which the centering elements 14 are provided that can be axially displaced and controlled by the lifting cam 10. On the upper side of the lifting cam support 11, facing away from the pillar 4, the annular upper support element 19 is mounted with a bearing 12 so as to be able to rotate about the machine axis MA. The annular upper support element 19 is again driven by the second drive 13, which in this embodiment interacts with a pinion 13.1 with gearing on the inside of the annular upper support element 19.

Figure 4:
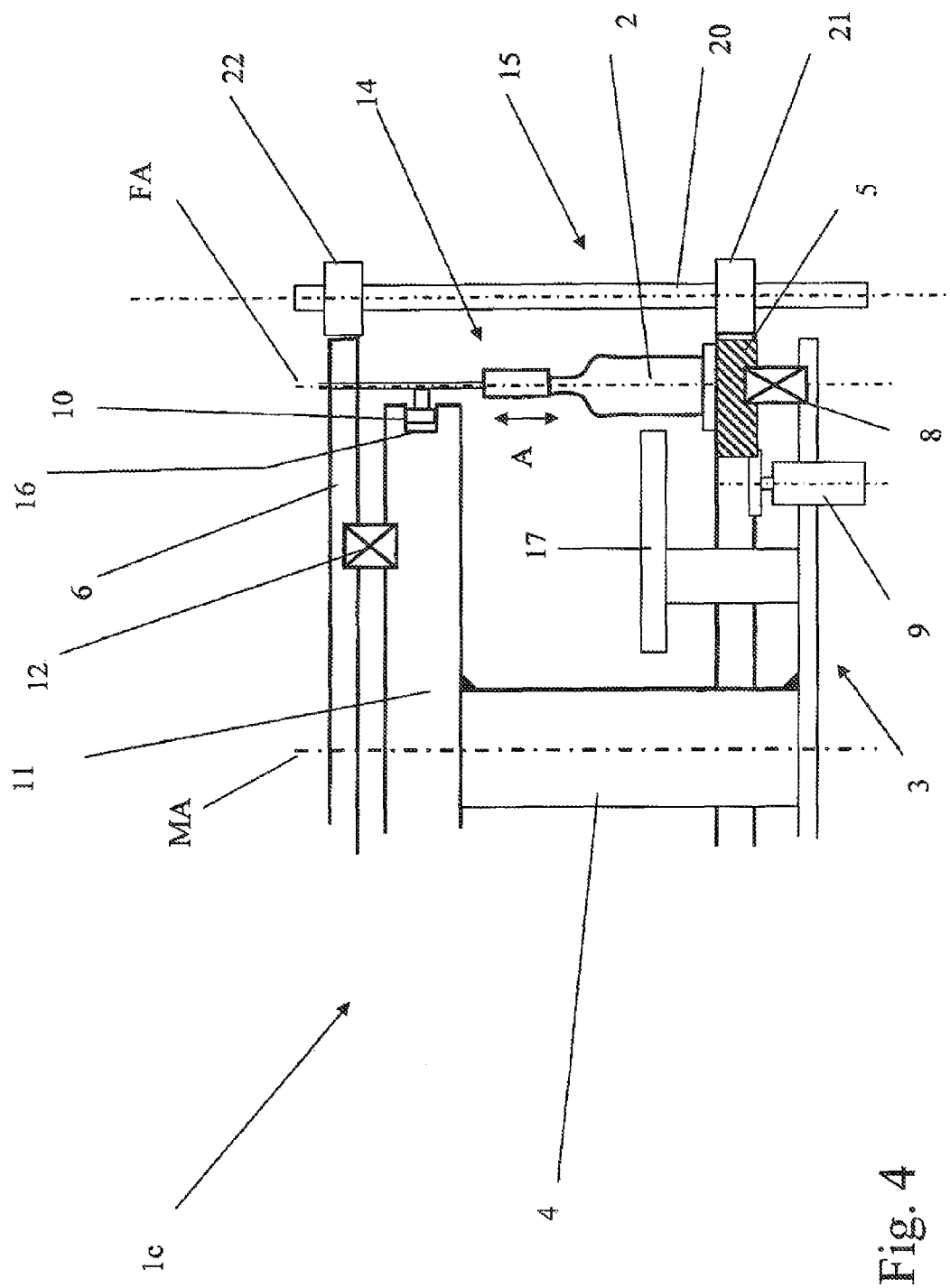
FIG. 4 shows a fourth embodiment of a rotary container-treatment machine in simplified schematic representation and vertical cross-section.

FIG. 4 shows a fourth container-treatment machine 1c whose only essential difference from the first container-treatment machine 1 is that the first drive 9 is provided in common for the rotor element 5 and the support element 6. To this end, the support element 6 is connected, for drive purposes, to the rotor element 5 by a shaft 20 that is mounted on the machine frame 3 so as to be able to rotate, and with its axis oriented parallel to the machine axis MA. On the shaft 20, which is offset radially outward from machine axis MA beyond the rotor element 5 and the support element 6, there are first and second gearwheels 21, 22, of which the first gearwheel 21 engages an external gearing of the rotor element 5 and the second gearwheel 22 engages an outer gearing of the support element 6.

With this embodiment it is also possible, in principle, to effect the drive of the rotor element 5 and of the support element 6 via the shaft 20 or via a drive or motor driving via the shaft 20, in which case the first drive 9 would be superfluous.

Figure 5:
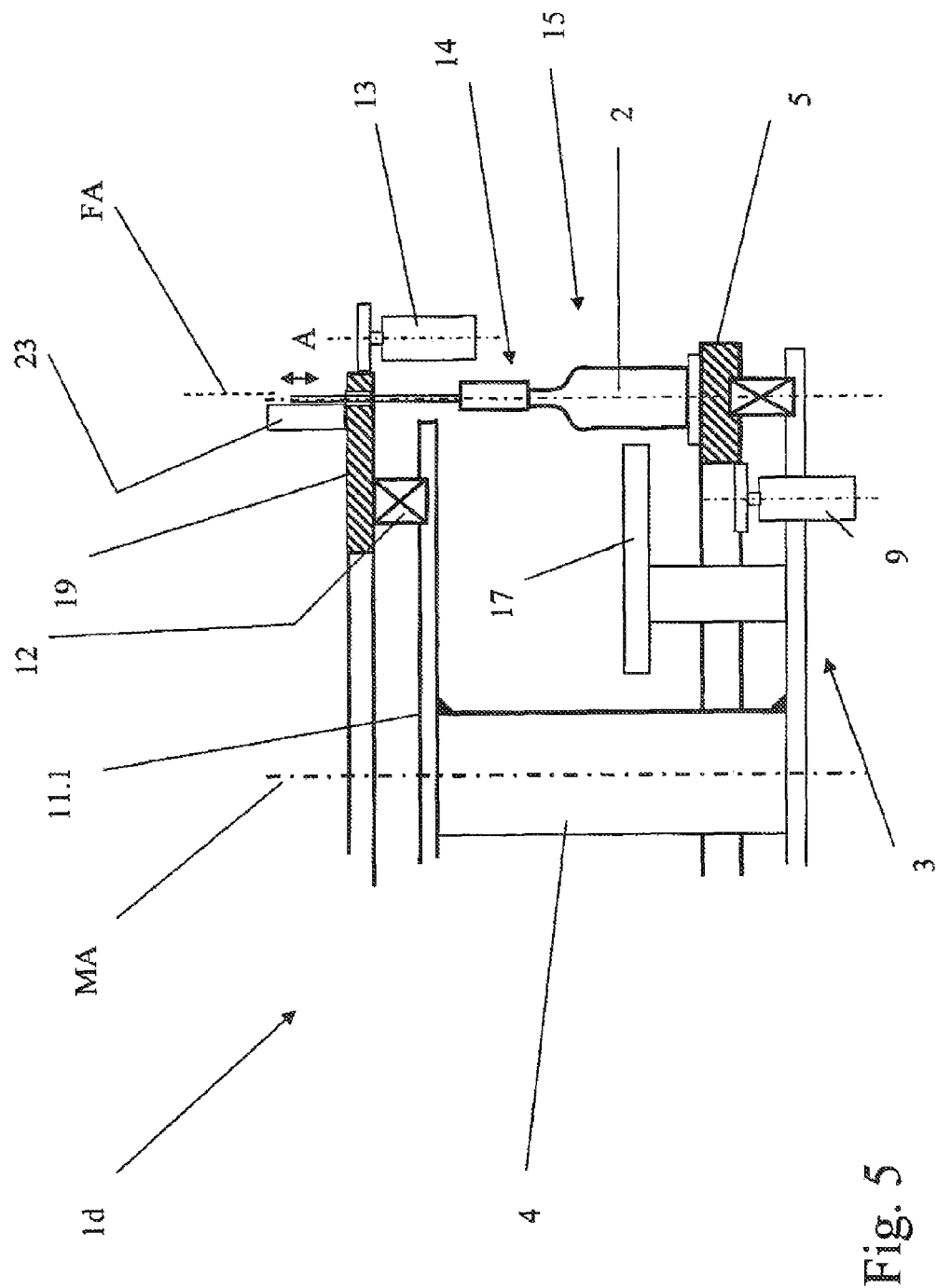
FIG. 5 shows a fifth embodiment of a rotary container-treatment machine in simplified schematic representation and vertical cross-section.

FIG. 5 shows, as a further embodiment, a fifth container-treatment machine 1d, whose only essential difference from the first container-treatment machine 1 is that the controlled upward and downward motion of the centering element 14 is effected not by a lifting cam but instead by a motorized actuating element 23 that is provided on the annular support element 19 for each centering tulip 14.1 separately, and that, for the upward and downward motion of the associated centering tulip 14.1, is controlled by a control device as a function of the rotational position of rotor 5/19 formed by the rotor element 5 and the annular upper support element 19. For this purpose each actuating element 23 has, for example, a pneumatically, hydraulically, or electrically operable actuator, e.g. at least one corresponding hydraulic or pneumatic cylinder, or an electromotive or electromagnetic drive.

Through the elimination of the lifting cam 10 and the control rollers 16 that interact with it, the disc-like or spoked-wheel-like bearing element 11a at the upper end of the pillar 4 serves solely to support and carry the annular upper support element 19 with the bearing 12. Unlike the representation of FIG. 3, with the fifth container-treatment machine 1d, the second drive 13 for the annular upper support element 19 is provided on the machine frame 3 in such a way that the pinion 13.1 interacts with gearing on the outside of the annular upper support element 19. Otherwise the fifth container-treatment machine 1d is the same as the third container-treatment machine 1b.

Figure 6:
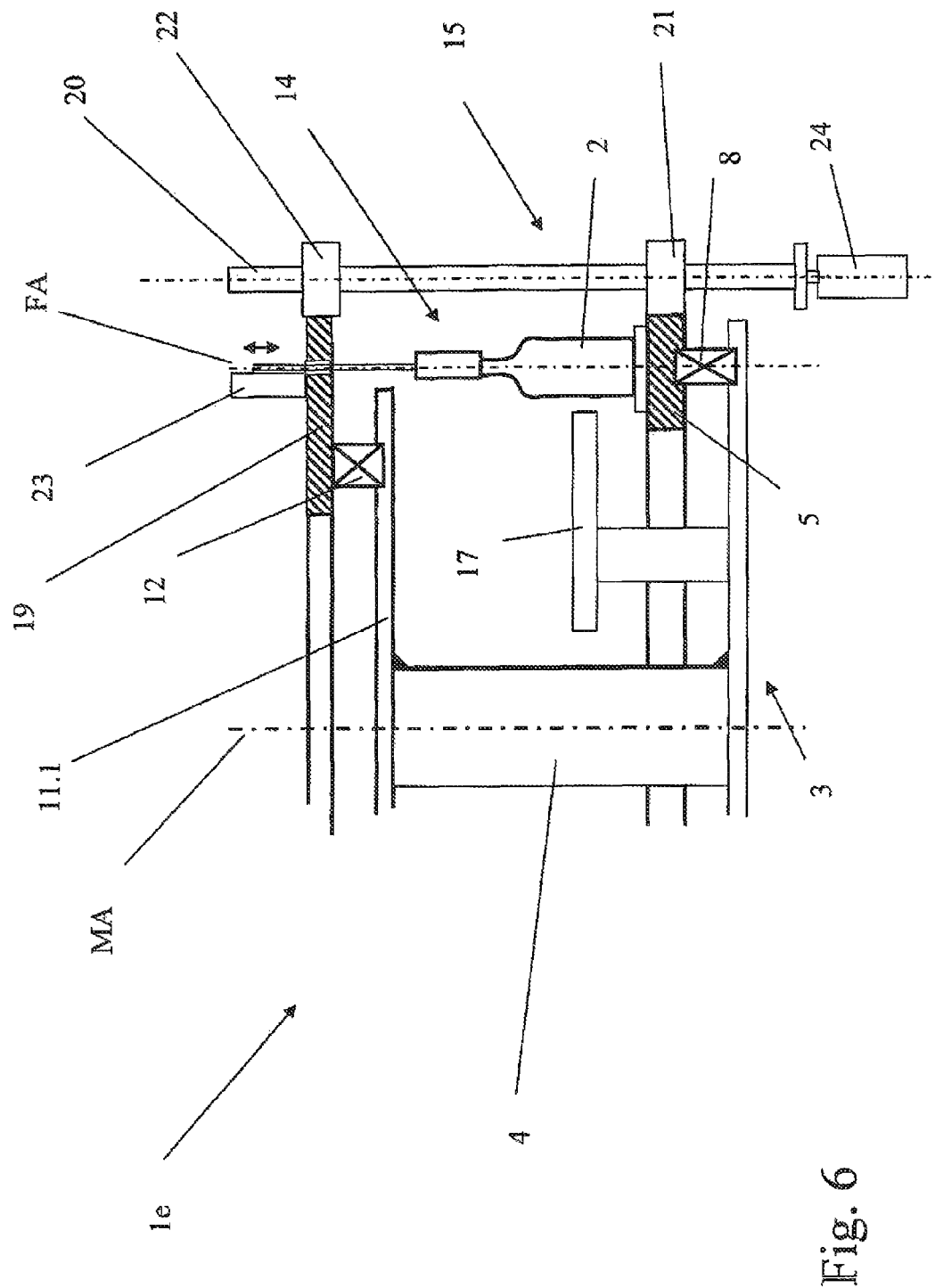
FIG. 6 shows a sixth embodiment of a rotary container-treatment machine.

FIG. 6 shows, as a further embodiment, a sixth container-treatment machine 1e whose only essential difference from the fifth container-treatment machine 1d is that a common drive 24 is provided for the rotor elements 5 and the annular upper support element 19. This common drive 24 drives both the rotor elements 5 and the annular upper support element 19 synchronously and in the same direction by the shaft 20 and the first and second gearwheels 21, 22 provided on it.

Figure 7:
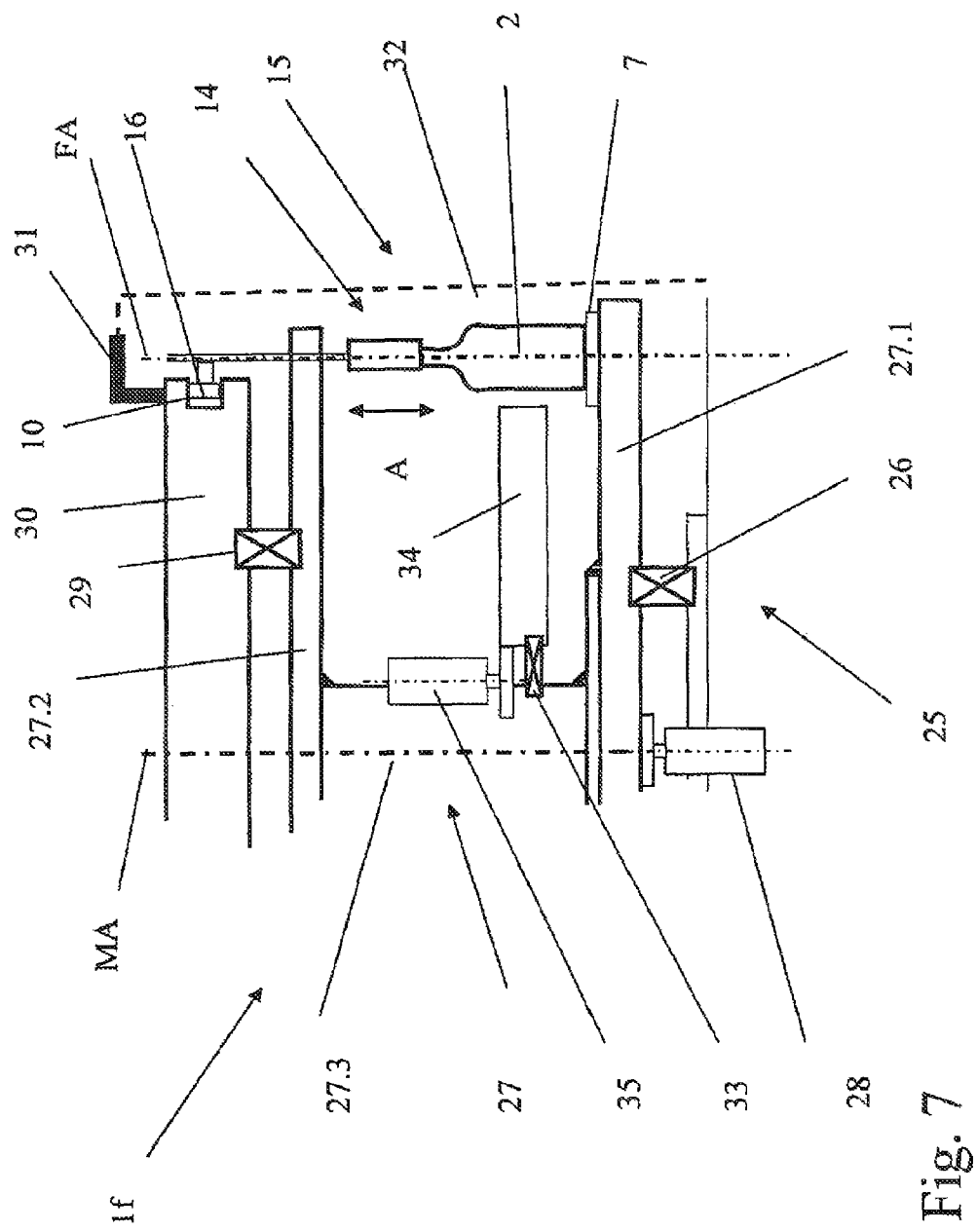
FIG. 7 shows a seventh embodiment of a rotary container-treatment machine.

FIG. 7 shows, as a further embodiment, a seventh container-treatment machine 1f, which is again configured as a rotary treatment machine, in this case with a rotor 27 that is mounted on a machine frame 25 by a bearing 26 so that it is able to rotate about vertical machine axis MA. The rotor 27 includes a lower rotor element 27.1, or turntable, that, at its circumference region, has bottle plates 7. The rotor 27 also includes an upper rotor element 27.2 on which are displaceably guided the centering tulips 14, each of which is allotted to one bottle plate 7 and hence to a treatment position 15 and their rods for a controlled up and down motion, as well as a pillar-like rotor element 27.3 that connects interspaced rotor elements 27.1, 27.2 and that is disposed on the same axis as the machine axis MA. A drive 28 drives the rotor 27 about the machine axis MA.

A lifting cam support 30 which at its end exhibits lifting cam 10 that interacts with control rollers 16 of centering elements 14, is mounted on rotor element 27.2 by means of at least one bearing 29. To prevent lifting cam support 30 rotating with rotor 27, cam support 30 is connected to machine frame 25 by at least one torque arm 31, as indicated by broken line 32 in FIG. 7.

As far as its rotor 27, its lifting cam support 30 and its connection to machine frame 25 by at least one torque arm 31 are concerned, the container-treatment machine 1f corresponds to conventional container-treatment machines. However unlike such conventional container-treatment machines, in the container-treatment machine 1f, a support element 34 is mounted on a pillar-like rotor element 27.3 by way of a bearing 33 within the trajectory of the bottle plate 7 or of the bottles 2 positioned thereon so as to be able to rotate about the machine axis MA. In an illustrated embodiment, the support element 34 is annular and disposed on the same axis as machine axis MA.

The support element 34 can be driven by a drive 35 about the machine axis MA synchronously with the rotational motion of rotor 27, i.e. at the same angular speed as the rotor 27, but in the opposite direction of rotation, such that the support element 34 is stationary, i.e. does not rotate when the rotor 27 rotates. For this purpose, the drives 28, 35 have correspondingly controllable drive motors, such as synchronous motors or stepper motors). Or, instead of two separate drives 28, 35, a common drive with a gearing arrangement that produces the synchronous and contra-rotational motion of the support element 34 is provided. As a carrier, the support element 34 allows the arrangement of functional elements, such as brushes or other elements for affixing labels on to bottles 2, within the circular trajectory on which the bottle plates 7 or the bottles 2 disposed thereon are moved when the rotor 27 rotates.

The operation of the container-treatment machines 1, 1a-1f corresponds to that of conventional container-treatment machines. The bottles 2 that are to be treated are fed one after the other via a container inlet to a treatment position 15 while the centering tulip 14 is initially raised. Each bottle 2 is then disposed standing upright with its bottle base on a bottle plate 7, i.e. with the bottle axis vertically oriented. As soon as it is on bottle plate 7, in fact while the transfer is still in progress, a centering tulip 14.1 is lowered down onto the top of the bottle, thus centering the bottle 2 and securing it from tipping over. This effectively clamps the bottle 2 between centering tulip 14.1 and bottle plate 7. As a result, it is possible to treat the bottles 2 even when the rotor of the container-treatment machines 1, 1a-1f rotates at a high rotational speed.

Bottles 2 that are moved by the rotor 5/6 or 5/19 or 27 are treated on an angular range of the rotational motion of the rotor that lies between the container inlet and a container outlet, from which the bottles 2 are removed from the treatment position 15 concerned and released by raising the centering tulip 14.

An advantage of the container-treatment machines 1, 1a-1e are that they largely avoid torque arms for functional elements of the container-treatment machine that do not rotate with the rotor 5/6 or 5/19 or 27 concerned. This avoids the complex and costly construction associated with such torque arms.

Another advantage is that when the lower rotor element 5 is configured as a ring, the region lying on the inside of the rotor element now becomes available for the vibration-free accommodation of functional elements that do not move with rotor 5/6 or 5/19, such as printers or print heads, cameras, sensors etc.

Another advantage of the container-treatment machines 1b, 1d and 1e is that the space enclosed by the annular upper support element 19 is also kept free for the arrangement of functional elements that do not rotate with the rotor 5/19.

The fourth and fifth container-treatment machines 1d, 1e have additional advantages. First, it is possible to avoid the complex and costly lifting cams 10. Second, the lifting motion of centering tulips 14.1, including in particular the extent of the lifting motion between the raised and lowered positions of centering tulips 14, can be adjusted without difficulty. This is useful when reconfiguring the container-treatment machine to handle a different container size. Thirdly, it is possible to control and/or regulate the force with which the lowered centering tulip 14.1 presses on the bottle 2 or other container. This makes it possible to optimally match the pressing force to the mechanical strength of the containers that are used. For containers that are easily crushed, such as bottles 2 made from plastic, e.g. PET containers or PET bottles, this is especially important.

Like conventional container-treatment machines, the container-treatment machine 1f has a torque arm 31. However, an advantage of the container-treatment machine 1f is that, despite the configuration of the lower rotor element 27.1 as a disc-like turntable or as a spoked-wheel-like element, and despite the resulting possibility of a simplified mounting, functional elements that do not rotate with the rotor 27 can be disposed inside the circular trajectory of the bottle plates 7, with no torque arms required.

Figure 8:
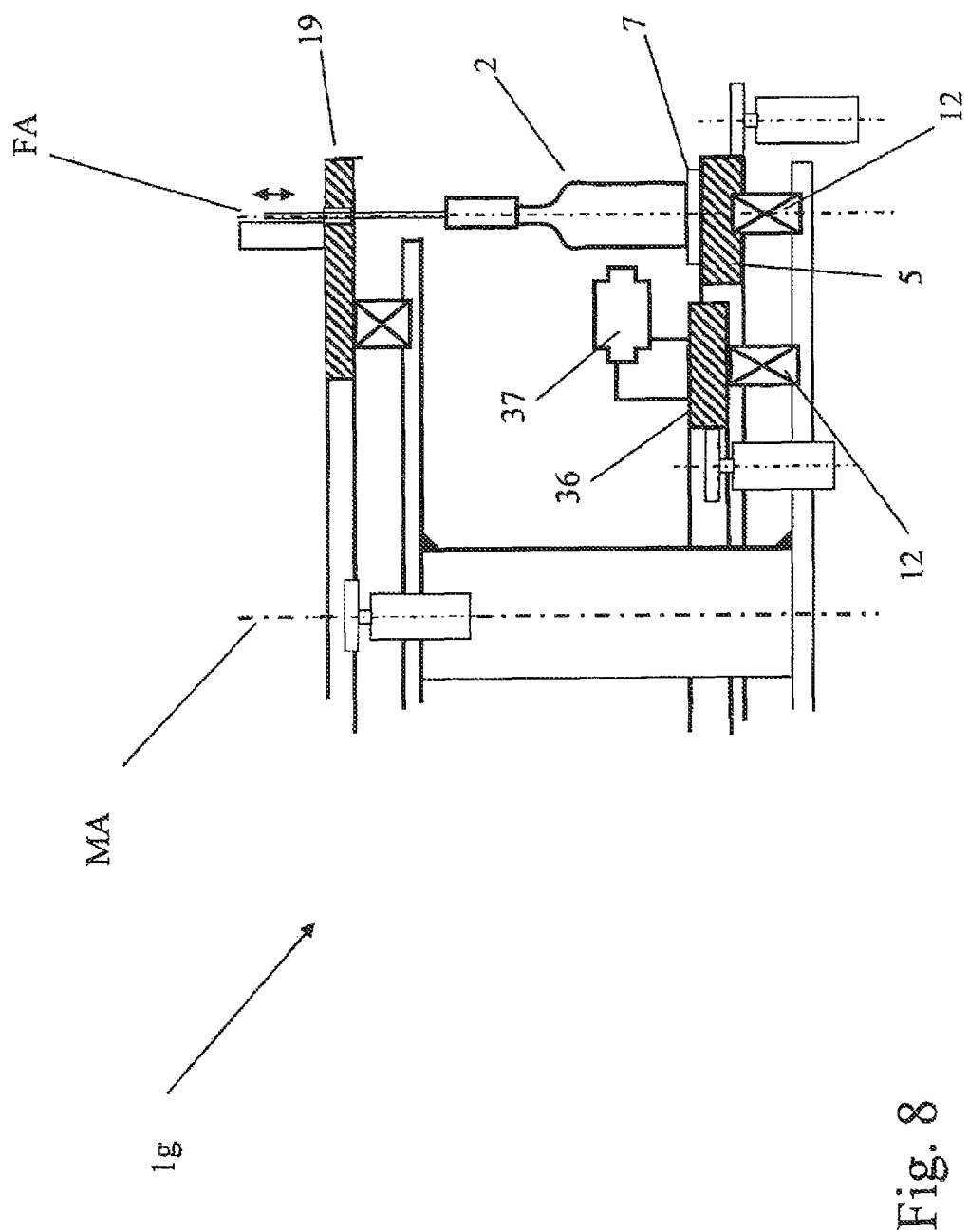
FIG. 8 shows a seventh embodiment of a rotary container-treatment machine.

FIG. 8 shows as a further embodiment of a container-treatment machine 1g whose only essential difference from the other disclosed container-treatment machines is that, in addition to the rotor element 5 and the annular upper support element 19, a further support element 36 is provided. This further support element 36 is preferably configured as an annulus mounted on the machine frame 25 by a bearing. The further support element 36 is disposed inside the rotor element 5 and is driven, for example, synchronously with it, i.e. with identical angular speed and angular direction.

Container treatment devices 37 are disposed on the support element 36. These container-treatment devices 37 are, for example, print heads for printing on the containers, and/or sensors for detecting physical variables, such as still image cameras, film cameras, and the like. One container-treatment device 37 is preferentially provided on the support element 36 for each bottle plate 7 disposed on the rotor 5.

Because the rotor 5 and the support element 36 have identical angular speeds and angular directions, and because each bottle plate 7 also has a dedicated container-treatment device 37, a container-treatment device 37 can act on a container 2 over its entire path between the inlet and the outlet star. As a result, a print head, such as a color print head, that is provided as a container-treatment device 37 now has sufficient time within which to print on a container 2 in a plurality of colors as may be required.

Common to all the embodiments, moreover is that, both relative to machine axis MA radially outward and in the direction of rotation as well as contrary to the direction of rotation of the particular rotor 5/6, 5/19 or 27, the individual treatment positions 15 are freely accessible in the manner that is necessary for the feeding and removal of containers or bottles 2 to and from treatment positions 15 respectively and for the treatment of the containers or bottles 2.

The invention has been described hereinbefore by reference to embodiments. It goes without saying that further variations as well as modifications are possible without departing from the inventive concept underlying the invention.

Having described the invention, and a preferred embodiment thereof, what is claimed as new and secured by Letters Patent is:

1. An apparatus for treating containers, said apparatus comprising a container treatment machine having at least one rotor element that can be driven to rotate about a vertical machine axis and serving as or exhibiting a container support, at least one support element associated with said rotor element, said support element being also rotationally drivable about the vertical machine axis for at least one functional element interacting with the containers, wherein the rotor element and the at least one support element are configured as autonomous rotating elements that are mounted independently of one another so as to be able to rotate about the vertical machine axis, wherein the at least one support element comprises a ring-like support element that concentrically encloses the machine axis, and wherein the at least one rotor element is an annular rotor element having an annular axis that is coaxial with the machine axis.

2. The apparatus of claim 1, wherein the at least one rotor element and the at least one support element are mounted independently of one another on a machine frame that does not rotate with either the rotor element or the support element.

3. The apparatus of claim 1, wherein the at least one rotor element comprises a rotor element selected from a group consisting of a disc-like turntable and a spoked-wheel-like turntable.

4. The apparatus of claim 1, wherein the at least one support element is configured like one of a disc and a spoked wheel.

5. The apparatus of claim 1, wherein the at least one support element comprises: a further rotor element for functional elements that are moved with the rotor and/or that interact with the containers, said further rotor element being mounted on a machine frame with at least one autonomous bearing so as to be able to rotate about the machine axis.

6. The apparatus of claim 5, wherein the functional elements are selected from a group consisting of centering elements and centering bells, either of which can be displaced in a controlled manner.

7. The apparatus of claim 6, wherein the container treatment machine further comprises: at least one lifting cam on a cam support of a machine frame that does not rotate with the rotor, control elements that engage the at least one cam for the controlled displacement of the functional elements.

8. The apparatus of claim 5, wherein the container treatment machine further comprises actuating or adjusting means, on the at least one support element, for the motorized controlled displacement of the functional elements provided on the support element.

9. The apparatus of claim 8, wherein the actuating or adjusting means comprises at least one of a hydraulic actuator, a pneumatic actuator, and an electric actuator.

10. The apparatus of claim 1, wherein the container treatment machine further comprises driving means for causing synchronous rotational motion, in both speed and angle, of the at least one rotor element and of the at least one support element.

11. The apparatus of claim 10, wherein when the at least one support element is configured as a further rotor element, the driving means is configured to drive the at least one rotor element and the at least one support element in the same direction.

12. The apparatus of claim 10, wherein when the at least one support element is configured as a support for functional elements not rotating with the rotor element, the driving means is configured to drive the at least one rotor element and the at least one support element in opposite directions.

13. The apparatus of claim 10, wherein the driving means comprises autonomous drives having corresponding drive motors.

14. The apparatus of claim 10, wherein the driving means comprises a drive with a common drive motor to which the at least one rotor element and the at least one support element are connected for driving purposes by at least partly different drive trains.

15. The apparatus of claim 14, wherein the at least one rotor element or the at least one support element is connected by a first drive train driven by the motor, and wherein the at least one rotor element and the at least one support element are interconnected for driving purposes by a second drive train.

16. The apparatus of claim 1, wherein the container treatment machine is configured for at least one of labeling containers, printing on containers, and inspecting containers.

17. An apparatus for treating containers, said apparatus comprising a container treatment machine having at least one rotor element that can be driven to rotate about a vertical machine axis and serving as or exhibiting a container support, at least one support element associated with said rotor element, said support element being also rotationally drivable about said vertical machine axis for at least one functional element interacting with said containers, wherein said rotor element and said at least one support element are configured as autonomous rotating elements that are mounted independently of one another so as to be able to rotate about said vertical machine axis, wherein said at least one support element comprises a further rotor element for functional elements that are moved with said rotor and/or that interact with said containers, said further rotor element being mounted on a machine frame with at least one autonomous bearing so as to be able to rotate about said machine axis, wherein said container treatment machine further comprises actuating or adjusting means, on said at least one support element, for motorized controlled displacement of said functional elements provided on the support element.

18. The apparatus of claim 17, wherein said actuating or adjusting means comprises at least one of a hydraulic actuator, a pneumatic actuator, and an electric actuator.

19. An apparatus for treating containers, said apparatus comprising a container treatment machine having at least one rotor element that can be driven to rotate about a vertical machine axis and serving as or exhibiting a container support, at least one support element associated with said rotor element, said support element being also rotationally drivable about said vertical machine axis for at least one functional element interacting with said containers, wherein said rotor element and said at least one support element are configured as autonomous rotating elements that are mounted independently of one another so as to be able to rotate about said vertical machine axis, wherein said container treatment machine further comprises driving means for causing synchronous rotational motion, in both speed and angle, of said at least one rotor element and of said at least one support element, and wherein when said at least one support element is configured as a support for functional elements not rotating with said rotor element, said driving means is configured to drive said at least one rotor element and said at least one support element in opposite directions.

* * * * *